(12) United States Patent  (10) Patent No.: US 8,259,478 B2
J'Neva Devi et al.  (45) Date of Patent: Sep. 4, 2012

(54) POWER INVERTER

(76) Inventors: Capra J'Neva Devi, Portland, OR (US);
Emilie Fetscher, Girdwood, AR (US);
Peter Jones, Portland, OR (US)

( * ) Notice: Subject to any disclaimer, the term of this patent is extended or adjusted under 35 U.S.C. 154(b) by 441 days.

(21) Appl. No.: 12/484,155

(22) Filed: Jun. 12, 2009

(65) Prior Publication Data

US 2010/0315850 A1    Dec. 16, 2010

(51) Int. Cl.
*H02M 7/48*  (2007.01)
(52) U.S. Cl. .......................................... 363/71
(58) Field of Classification Search ............... 363/55, 363/65, 71
See application file for complete search history.

(56) References Cited

U.S. PATENT DOCUMENTS

| 6,175,512 | B1 * | 1/2001 | Hagihara et al. | 363/71 |
| 7,514,813 | B2 * | 4/2009 | McKelvey et al. | 307/32 |
| 7,566,232 | B2 * | 7/2009 | Iida | 439/145 |
| 7,733,670 | B2 * | 6/2010 | Feng et al. | 363/17 |

* cited by examiner

*Primary Examiner* — Matthew Nguyen

(57) ABSTRACT

A power inverter is provided for converting DC power into AC power. The inverter may be operable to couple to two or more transformer modules each operable to convert at least a portion of the DC power to at least a portion of the AC power. In one embodiment, two or more transformer modules are removably coupled to the inverter. In an alternative embodiment, the inverter is capable of electrically coupling to an externally-housed transformer module. In an alternative embodiment, the inverter may include two or more transformer modules hard-wired into the device. The inverter may include an AC safety plug for releasably connecting to an AC power network and outputting AC power. The inverter may include one or more sensors configured to detect one or more properties of the AC power network for the purposes of determining whether a connection to the power network should be established.

17 Claims, 9 Drawing Sheets

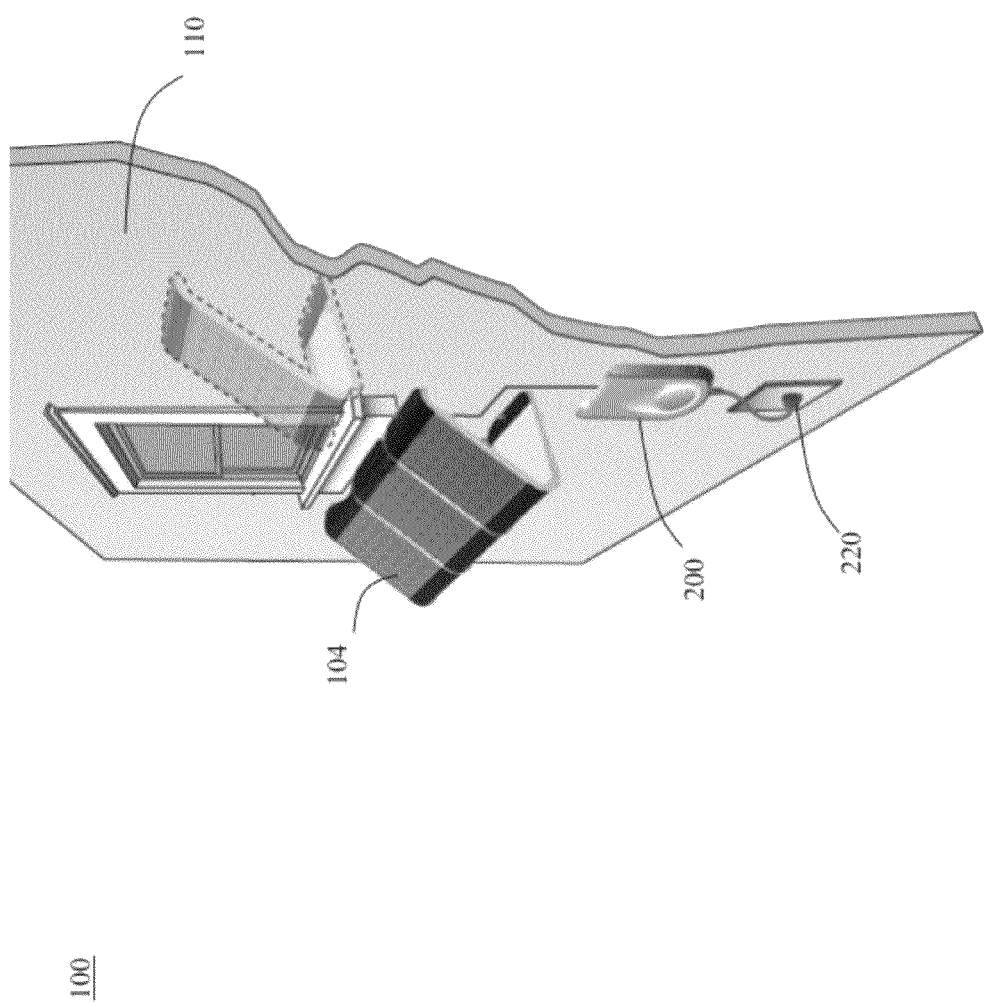

POWER INVERTER

BACKGROUND

1. Field

The present disclosure relates generally to power inverters, and more particularly, to modular plug-and-play power inverters for a renewable energy power source.

2. Related Art

Renewable energy generators, such as solar panels, often produce an output in the form of direct current (DC) electric power. However, many loads require power in the form of an alternating current (AC) electric power having a particular frequency and voltage. Thus, in order to use energy produced by a renewable energy generator in, for example, a home, an inverter may used to convert the DC electric power output of the generator into an AC electric power having the desired characteristics.

Generally, renewable energy generators, such as solar panels, produce intermittent, highly variable, DC power outputs with dynamic ranges. This is largely due to the variable nature of the input to the renewable energy generators. For example, the amount of energy generated by a solar panel relies heavily on the amount of sunlight reaching the panel's surface. Since the intensity of sunlight changes constantly throughout the day, the DC power output of the solar panel is also constantly changing. A problem caused by such a dynamic range of input power is reduced efficiency at low power levels. Inverters convert DC power to AC power more efficiently when the input DC power closely matches the optimal power rating of the inverter. Since the DC power output of a renewable energy generator is intermittent and highly variable, current inverters often suffer from efficiency loss due to the fluctuations in the DC power output. Thus, an inverter capable of matching the optimal power rating of the inverter to its DC power input is desired.

Additionally, multiple renewable energy generators are often operated in conjunction, resulting in a power output equal to the sum of the individual generator outputs. However, the number of generators used in one application may vary drastically from the number of generators used in another application or in the same application over time. Due to the unpredictable inversion demands of expandable systems, the selection of a properly rated inverter may be difficult. Current inverters, particularly inverters having a static inversion capacity, are at risk of either being underrated, resulting in wasted power-generating capacity, or overrated, resulting in inefficiency both in power inversion and cost of materials. Even if an inverter adequate for existing inversion demand is selected, a user may find the inverter inadequate for changing needs as additional energy generators are added or removed from a system. Thus, an inverter capable of expanding its inversion capacity by coupling to multiple transformer modules is desired.

Depending on the amount of power generated by a renewable energy generator and the power demands of the generator's user, more power may be produced than can be consumed by the user. In this event, rather than have the excess power go to waste, the user may sell the power to a utility company. For example, a home owner having solar panels fixed to the roof of his/her home may sell the power generated by the solar panels to the local electric utility. In return, the home owner may receive a credit on his/her next electricity bill or receive some other form of compensation. Some current inverters may be capable of calculating, recording, and communicating the amount of power delivered to the utility company. However, the cost of replicating such communication devices, memory chips, system control, and data logging capability within existing scalable systems such as AC Modules, makes the cost of such systems prohibitive for many users. Thus, an inverter capable of separating costly "intelligent" features from inversion capacity features is desired.

When used to power a particular location, current generator systems may suffer from "islanding." Islanding refers to the condition whereby a generator continues to power a location even though power from an electric utility is no longer present. This creates a dangerous situation as others may not be aware of the generator and may be harmed by the generated power. For example, utility workers may assume that a building is un-powered and may be electrocuted while working with the building's electrical wires. Thus, an inverter including safety measures for safely disconnecting the generator from the load in the event of a loss of electric utility power is desired.

Within the solar field, AC Modules provide one solution to scalability; however, they output a high-voltage, making them unsafe for handling by unskilled laborers and requiring expensive electricians for the installation and preparation of such systems. This also restricts the inverter to a single location. Therefore, a portable inverter operable to easily connect to a household AC power network and providing a low-voltage solution to inverter scalability is desired.

BRIEF SUMMARY

A power inverter for converting a direct current (DC) power to an alternating current (AC) power, the inverter having an inverter coupling circuit capable of electrically coupling to two or more transformer modules, each transformer module operable to convert at least a portion of the DC power to at least a portion of the AC power.

In one embodiment, two or more transformer modules are removably coupled to the inverter coupling circuit.

In an alternative embodiment, the power inverter coupling circuit is capable of electrically coupling to an externally-housed transformer module.

In an alternative embodiment, the power inverter coupling circuit includes two or more transformer modules hard-wired into the device. The power inverter is operable to selectively turn the transformer modules on and off based on the input power.

In a further embodiment, the power inverter includes an AC safety plug capable of releasably connecting to an AC power network and outputting AC power to the network. The inverter having an AC safety plug may include one or more sensors configured to detect one or more properties of the AC power network for the purposes of determining whether a connection to the power network should be established.

BRIEF DESCRIPTION OF THE DRAWINGS

FIG. 1A illustrates an exemplary environment in which a power inverter may operate.

DETAILED DESCRIPTION

Figure 1B:
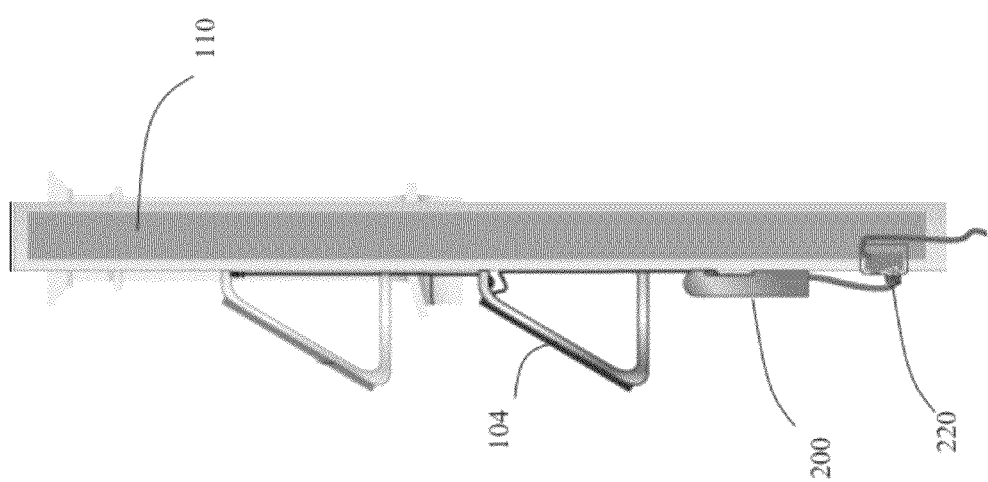
FIG. 1B illustrates an exemplary environment in which a power inverter may operate.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Power Generation System

FIG. 1A illustrates an exemplary environment 100 in which power inverter 200 may operate as a component of a power generation system. According to one embodiment, energy from a renewable energy source (e.g., the Sun), may be collected and converted into electrical energy (e.g., by photovoltaic panel 104). In one example, one or more photovoltaic panels 104 may convert the solar energy into a DC power output. Specifically, in one example, the DC power output may be a 12 volt (V) DC output. However, it should be appreciated that the DC power output may have any DC output voltage, including variable outputs.

Exemplary environment 100 may further include a load, for example home 110, operating on AC power. In one example, home 110 operates on a 120V AC power supply. Therefore, in order to power home 110 using photovoltaic panel 104, a DC to AC (DC-AC) power inverter, such as power inverter 200, may be used to convert the DC output of photovoltaic panel 104 into an AC output. In one example, the AC output may be a 120V AC output.

In the example depicted in FIG. 1A, power inverter 200 includes safety plug 220 for connecting to a socket coupled to an AC power network. In addition to other functions, safety plug 220 allows power inverter 200 to be portable and to connect to a conventional AC socket. A more detailed description of safety plug 220 will be provided, below. Alternatively, power inverter 200 may output AC power to the AC power network through a traditional hard-wired configuration (not shown).

FIG. 1B illustrates a side-view of exemplary environment 100.

The elements of FIG. 1A and FIG. 1B are shown as separate items for illustrative purposes only. In some examples, the various elements of FIG. 1A and FIG. 1B may be combined into a single element as will be appreciated by those of ordinary skill in the art. For example, power inverter 200 may be integrated within a single housing along with photovoltaic panel 104.

Power Inverter

Figure 2A:
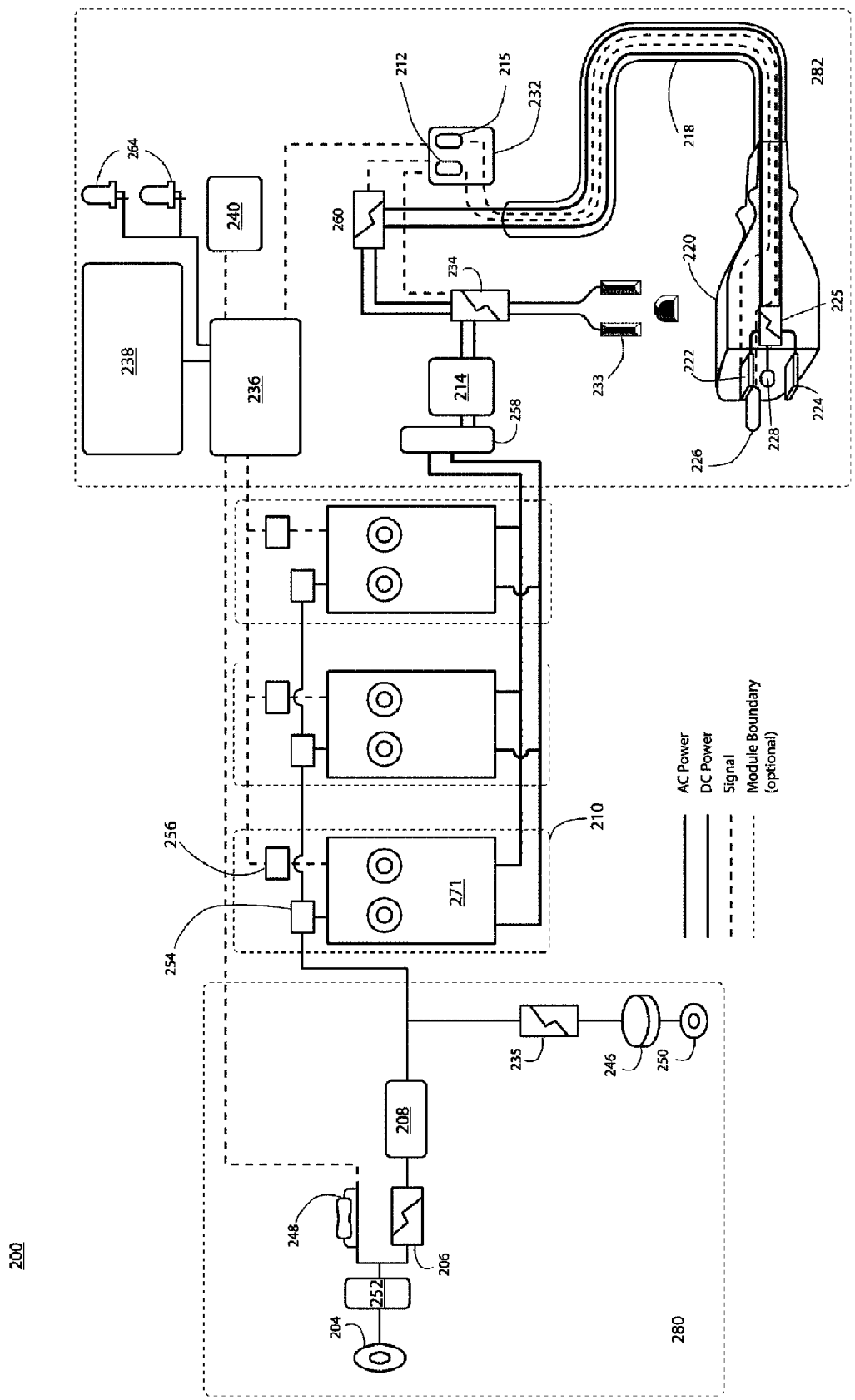
FIG. 2A illustrates an exemplary power inverter according to one embodiment.

FIG. 2A illustrates an exemplary power inverter 200 according to one embodiment. In FIG. 2A, power inverter 200 may be operable to couple to an external DC power source and convert a DC power input into an AC power output. Power inverter 200 may be further operable to couple to an AC power network (e.g., a residential AC power network).

The AC power output, converted from a DC power input by power inverter 200, may be delivered to the AC power network. In one example, the user of power inverter 200 may receive credit or compensation based on the amount of power delivered to the AC power network.

In another example, power inverter 200 may be further operable to calculate the amount of power converted by the inverter and store the data locally or remotely. Power inverter 200 may further contain safeguards to reduce power loss and prevent damage to the device.

According to one embodiment, the operation and components of power inverter 200 may be categorized into three separate functions. The first function may be receiving a DC power input and performing power-cleaning functions on the DC input. The second function may be converting the DC power into AC power. The third function may be power inverter control and AC power output.

In one example, the first function may be performed by DC module 280, the second function may be performed by inverter coupling circuit 210, and the third function may be performed by AC module 282. It should be appreciated that the grouping of components into inverter coupling circuit 210, DC module 280, and AC module 282 are conceptual rather than physical. For instance, module 280 is not required to be physically separate from module 282. Various embodiments of a power inverter which includes inverter coupling circuit 210, DC module 280, and AC module 282 are described in greater detail, below.

DC Power Source

As shown in FIG. 2A, power inverter 200 may include DC input 204 for receiving a DC power input from an external DC power supply. DC input 204 may be any electrical connector operable to connect two devices and transfer power from one device to the other. For example, DC input 204 may be a gendered female socket configured to receive a male plug from the DC power supply. Alternatively, DC input 204 may be operable to connect to a non-gendered plug. In one example, DC input 204 may be a center-pin DC jack, Anderson Powerpole, or PowerMod®HP. However, it should be appreciated that such connectors are well-known by those of ordinary skill in the art and that any connector operable to transfer power from one electronic device to another may be used.

In one example, illustrated by FIG. 1A, the DC power supply may be a renewable energy generator such as photovoltaic panel 104. It should be appreciated that other DC power supplies may be used, such as wind generators, geothermal generators, micro hydroelectric generators, diesel generators, solid state generators, and the like.

As shown in FIG. 1A, more than one photovoltaic panel 104 may be coupled to power inverter 200. One of ordinary skill in the art will recognize that any number of energy generators may be used.

According to one embodiment, DC input 204 may be operable to receive a 12V DC power input from the external DC power supply. However, power inverter 200 may be configured to receive any DC power voltage by selecting components with the appropriate ratings.

DC Load Switch

As depicted in FIG. 2A, Power inverter 200 may further include a DC load switch 206 for electrically connecting and disconnecting power inverter 200 from the external DC power supply, which is additionally protected from feedback through blocking diode 252. In one example, the DC power received at DC input 204 may be directed through DC load switch 206 which is operable to selectively connect and disconnect DC input 204 from the other components of power inverter 200 if a predetermined condition occurs.

In one example, if the DC power supply connected to DC input 204 exceeds a predetermined threshold (e.g., the voltage of the DC power supply exceeds a predetermined value), DC load switch 206 may open to electrically disconnect the DC power supply from the other components power inverter 200. Additionally, if the DC power supply connected to DC input 204 falls below a predetermined threshold (e.g., the voltage of the DC power supply falls below a predetermined value), DC load switch 206 may also open to electrically disconnect the DC power supply from the other components of power inverter 200. Further, if the DC power supply falls within an acceptable range set by the predetermined upper and lower thresholds, DC load switch 206 may be operable to close and connect the DC power supply to the other components of power inverter 200. This protects power inverter 200 from overload and low power conditions.

In another example, power inverter 200 may include a manual external shut-off switch (not shown) operable to open DC load switch 206 and disconnect the DC power supply from the other components of power inverter 200. For example, a manual shut-off may be employed when a utility company worker conducts repairs on a line. The manual external shut-off switch may be operable to control DC load switch 206 either through a wire or a wirelessly.

Switches operable to selectively open and close a circuit are well-known by those of ordinary skill in the art. Any such switch may be used in power inverter 200. In one example, DC load switch 206 may simply be a mechanical switch operable to open and close the circuit in response to a signal received from a microprocessor (e.g., processor 236), DC power sensor 248, or a physical switching device. The signal may be received through a wire or wirelessly using a communication device.

The operation of DC load switch 206 will be described in greater detail below with respect to FIG. 3.

Power Regulator

Power inverter 200 may further include power regulator 208 for optimizing the power output of the system through control of DC current, voltage, or both current and voltage. In one embodiment, power regulator 208 may be a maximum power point tracker (MPPT) or a DC to DC converter controlled by a maximum power point tracking algorithm. In one example, power regulator 208 may be controlled by processor 236.

DC Bypass

Power inverter 200 may further include DC bypass switch 235 for bypassing the circuitry of power inverter 200 responsible for converting DC power into AC power. For example, DC bypass switch may direct the DC output of power regulator 208 away from the components included within inverter coupling circuit 210 and AC module 282. Instead, the output of power regulator 208 may be directed to DC bypass outlet 250. DC bypass switch 235 allows power inverter 200 to provide a DC power output to DC bypass outlet 250 instead of an AC power output.

DC bypass outlet 250 may be a female socket operable to deliver DC power to a device having a male plug configured to connect to DC bypass outlet 250. However, it should be appreciated that DC bypass outlet 250 may take the form of any connector allowing power to be transferred from power inverter 200 to an external device.

In one example, a battery may be connected to DC bypass outlet 250 to store power when no AC power network or load is connected.

In another example, when in a first position, DC bypass switch 235 may be operable to electrically connect the output of power regulator 208 to inverter coupling circuit 210 and electrically disconnect the output of power regulator 208 from DC bypass outlet 250. When in a second position, DC bypass switch 235 may be further operable to electrically disconnect the output of power regulator 208 from inverter coupling circuit 210 and electrically connect the output of power regulator 208 to DC bypass outlet 250. The position of DC bypass switch 235 may be controlled by a microprocessor, an external switch, an external button, an option provided in the user interface, or any other means allowing a user to selectively open and close DC bypass switch 235.

In one example, DC bypass switch 235 may simply be a mechanical switch operable to connect an input terminal to one of two output terminals. However, switches like that described above are well-known by those of ordinary skill in the art and any such switch may be used.

According to one embodiment, the output DC voltage may be configurable by the user. For example, potentiometer 246 or switch control may be provided to selectively adjust the output voltage at DC bypass outlet 235.

Electrical Inverter

Power inverter 200 may further include inverter coupling circuit 210 for coupling to modules operable to convert a DC power into an AC power. As described herein, a module for converting a DC power to an AC power may also be referred to as a "transformer module." Additionally, as will be explained in greater detail below, inverter coupling circuit 210 may include any number of transformer modules.

In one example, the output of power regulator 208 may be directed to inverter coupling circuit 210. Inverter coupling circuit 210 may include DC voltage divider 254 for distributing the received DC power across the transformer modules of inverter coupling circuit 210. Such voltage dividers are well-known by those of ordinary skill in art and any such voltage divider having the desired power rating and characteristics may be used.

As shown in FIG. 2A, inverter coupling circuit 210 may include one or more connection circuits. The connection circuits may each be operable to connect to a transformer module. In one example, illustrated by FIG. 5B, the connection circuits may be slots 270, 272, and 274 operable to couple to a transformer module, such as transformer module 275. The slots may be may be coupled together and controlled using processor 236, control transformers 256, and DC voltage dividers 254. In another example, the slots may be controlled using a signal sent from processor 236. The slots allow power inverter 501 to be expandable and configurable based on the expected DC power input. For example, when used with a small number of solar panels, a user may insert a single transformer module into a slot of power inverter 501. If additional solar panels are later connected to power inverter 501, additional transformer modules may then be added to support the increased DC power input.

In an alternative embodiment, the connection circuits may be configured so that one or more transformer modules are hard-wired into the power inverter, rather than configured as slots operable to receive removable transformer modules. FIG. 2A illustrates an inverter coupling circuit 210 having three transformer modules (e.g., transformer module 271) hard-wired in the device and permanently coupled to inverter coupling circuit 210. In this embodiment, power inverter 200 may selectively turn on and off each module based on the input power. In one example, processor 236 may be operable to control each module. The process of selectively turning transformer modules on and off is described below with respect to FIG. 3.

In another embodiment, the transformer modules for coupling to inverter coupling circuit 210 may be contained within one or more separate housings capable of interlocking with the main housing of inverter 200, as described in more detail below with respect to FIG. 5A. It should be noted that while three transformer modules are shown in FIG. 2A, there could be as few as one and as many as required for converting the desired amount of power.

Additional transformer modules, whether internal or external, may be coupled to inverter coupling circuit 210 to increase the overall power rating of power inverter 200, as needed. Notably, expansion of capacity through the addition of further transformer modules would not require duplication of other shared system elements such as DC load switch 206, power regulator 208, or processor 236.

Using the modular inverter coupling circuit 210 described above may save costs and increase inversion efficiency by allowing power inverter 200 to use only the number of transformer modules required for a particular application. Further, the modularity allows power inverter 200 to be expandable in the event that a larger DC power input is expected. As discussed above, this is particularly beneficial for use with a renewable energy generation system that may contain anywhere from a single renewable energy generator to multiple generators, for example.

Inverter coupling circuit 210 may further receive a reference frequency as an input. In one example, a reference frequency may be received from clock sensor 212 located in AC power network sensor 232, which is described in greater detail, below. Alternatively, the reference frequency may be received from processor 236. In another example, inverter coupling circuit 210 may further include control transformer 256 for synchronizing the transformer modules using the reference frequency from clock sensor 212 or processor 236. Control transformer 256 may control and synchronize the switching of the transformer modules with the frequency of the AC power network. In one example, control transformer 256 may be a pulse width modulator, commonly used to synchronize to an AC power network.

The received reference frequency may be used to generate an AC power output having the same frequency as the AC power network and through the synchronization of the transformer modules with the use of control transformer 256. Control transformer 256 may also be used to eliminate delay between the transformer modules.

Step-Up/Step-Down Transformer

Power inverter 200 may further include step-up or step-down transformer 258 for regulating the voltage or current of an AC power. In one example, the input of step-up or step-down transformer 258 may be electrically coupled to the output of inverter coupling circuit 210. In this example, step-up or step-down transformer 258 may be operable to convert the voltage or current of an input AC power into a desired voltage or current of an output AC power.

Wave Shaper

Exemplary power inverter 200 may further include filter and wave shaper 214 to shape the AC output of inverter coupling circuit 210 into a sinewave and to remove harmonics. For example, a capacitor may be used to trim spikes created by switching in the transformer modules. In one example, filter and wave shaper 214 may receive an AC power input from step-up or step-down transformer 258 and be operable to shape the input signal into a sinewave output.

Filter and wave shapers including smoothing circuits are well-known by those of ordinary skill in the art, and any such filter and wave shaper having the desired input and output characteristics may be used in power inverter 200.

AC Bypass

Power inverter 200 may further include AC bypass switch 234 for bypassing output cable 218 and safety plug 220. When output cable 218 and safety plug 220 are bypassed, AC power is instead delivered to AC bypass outlet 233. AC bypass outlet 233 may be a female socket configured to deliver AC power to a device having a male plug configured to connect to AC bypass outlet 233. However, it should be appreciated that AC bypass outlet 233 may take the form of any connector allowing AC power to be transferred from power inverter 200 to an external device.

In one example, when in a first position, AC bypass switch 234 may be operable to electrically connect the output of filter and wave shaper 214 to output cable 218 and electrically disconnect the output of filter and wave shaper 214 from AC bypass outlet 233. When in a second position, AC bypass switch 234 may be further operable to electrically disconnect the output of filter and wave shaper 214 from output cable 218 and electrically connect the output of filter and wave shaper 214 to AC bypass outlet 233. The position of AC bypass switch 234 may be controlled by an external switch, an external button, an option provided in the user interface, or any other means allowing the user to make a selection. In another example, the position of AC bypass switch 234 may be controlled by a microprocessor (e.g., processor 236) which is operable to set the position of AC bypass switch 234 automatically when ground sensor 215, AC power network sensor 232, or contact button 228 detects a condition outside acceptable limits.

In one example, AC bypass switch 234 may simply be a mechanical switch operable to connect an input terminal to one of two output terminals. However, one of ordinary skill in the art will recognize that any switch with the functionality stated above may be used.

Clock Sensor

AC power network sensor 232 of power inverter 200 may further include clock sensor 212 for detecting and providing a stable reference frequency. In one example, clock sensor 212 may be electrically coupled to an AC power network connected to power inverter 200. Clock sensor 212 may be operable to detect the frequency of the AC power network and use this detected frequency to generate the output reference frequency. AC power network sensor 232 may then provide the reference frequency, which reflects the detected frequency of the AC power network, to various components of power inverter 200.

In one example, the AC power network of the United States operates at a frequency of 60 Hz. Thus, when power inverter 200 is used in the United States, clock sensor 212 detects an AC power network frequency of 60 Hz and synchronizes the AC frequency generated by the inverter coupling circuit 210 with the frequency of the AC power network. Likewise, when power inverter 200 is used with an AC power network having a different frequency, such as the United Kingdom, the reference frequency provided by clock sensor 212 will reflect the detected frequency of that AC power network.

Clock sensors such as those described above are well-known to those of ordinary skill in the art. It should be appreciated that any clock sensor operable to detect the frequency of an AC network and provide the detected frequency to other components in a circuit may be used in power inverter 200. For example, a CMOS inverter or a zero-crossing pulse generator in conjunction with the processor 236 may be used to detect and synchronize the frequency to the AC power network.

In another example, clocks sensor 212 or processor 236 may be further operable to generate a reference signal having a predetermined frequency regardless of any connection to an AC power network. For instance, when power inverter 200 is not connected to an AC power network, clocks sensor 212 does not have an AC power network frequency to use to generate a reference frequency. However, it may still be desirable for power inverter 200 to be able to output AC power at a set frequency. Thus, clocks sensor 212 may be operable to generate a reference signal having stable frequency even in the absence of an AC power network.

In one example, the predetermined frequency may be obtained from a crystal oscillator. However, one of ordinary skill in the art will recognize that any method of generating a stable reference frequency may be used. For example, a MOSFET, for instance a 555 chip programmed as a low-frequency oscillator, would suffice to generate such a reference frequency. Alternatively, processor 236 may be used to generate the frequency.

According to one embodiment, the predetermined frequency may be 60 Hz for use in the United States. However, it should be understood that any frequency may be selected depending on the intended use of the device. For instance, if power inverter 200 is intended to be used in the United Kingdom, a reference signal frequency of 50 Hz may be selected to match the electronic devices used in that country.

Generating a predetermined frequency allows power inverter 200 to output an AC power supply having a predetermined frequency even when the inverter is not connected to an AC power network. For example, power inverter 200 may provide AC power directly to a load (such as an electronic device) via AC bypass outlet 233.

Output Safety Plug

Power inverter 200 may further include output cable 218 for delivering the AC power converted by power inverter 200 to an electrical outlet or other load device. Attached to output cable 218 may be safety plug 220. Safety plug 220 may be operable to deliver the AC power converted by power inverter 200 to a socket configured to receive safety plug 220.

In one example, safety plug 220 includes output terminals 222 and 224 for transferring the AC power provided by power inverter 200 to a socket connected to an AC power network or other load device. Safety plug 220 may further include grounding pin 226 for grounding power inverter 200 and for obtaining a ground reference through ground reference sensor 215. Grounding pin 226 and output terminals 222 and 224 may be configured to plug into a wall socket connected to an AC power network. In FIG. 2A, the safety plug 220 is depicted as an ordinary electric plug. However, it should be appreciated that any device sufficient to connect and remove the inverter 200 from a power network could be used as a safety plug 220, including but not limited to a terminal capable of connecting to a load center, such as a breaker device.

In another example, safety plug 220 may further include contact button 228 operable to detect contact between safety plug 220 and a socket. Contact button switch 225 may be coupled to depressible projection 228 on the face of plug 220 which may be configured to make contact with the face of a socket when safety plug 220 is inserted into the socket. Contact button 228 and contact button switch 225 may be used to determine if safety plug 220 has been sufficiently inserted into a socket. In one example, contact button switch 225 may be operable to close and complete the circuit within safety plug 220 upon full depression of contact button 228. Contact button switch 225 may be further operable to open the circuit within safety plug 220 upon safety plug 220 being partially removed from the socket.

In one example, contact button switch 225 may be a mechanical switch operable to disconnect power inverter 200 from output terminals 222 and 224 of safety plug 220. In another example, switch 225 may be an electrical switch operable to send a signal to switch 260 to disconnect power inverter 200 from output terminals 222 and 224 of safety plug 220.

In yet another example, power inverter 200 may further include AC power network sensor 232 for detecting a property associated with an AC power network attached to safety plug 220. In one example, the property associated with the AC power network may be a voltage or a load. For example, safety plug 220 may be inserted into a socket and AC power network sensor 232 may detect the load or voltage of the AC power network connected to the socket. Voltage sensors and load sensors are well-known by those of ordinary skill in the art and any such sensor operable to detect the properties of an AC network as described herein may be used in power inverter 200. In one example, a circuit employing resistors operable to detect a voltage on the line may be used by power inverter 200.

In yet another example, AC power network sensor 232 may be further operable to control switch 260. In one example, switch 260 may be an electrical switch operable to electrically disconnect power inverter 200 from output terminals 222 and 224 of safety plug 220 in the event that the detected load or voltage fails to fall within a predetermined range. For example, switch 260 may be operable to electrically connect power inverter 200 to output terminals 222 and 224 of safety plug 220 when the voltage of the AC power network is between 100V and 120V.

In yet another example, switch 260 may be controlled by both ground sensor 215 and AC power network sensor 232. In this situation, both sensors must detect conditions within a predetermined range in order for switch 260 to electrically connect power inverter 200 to the output terminals of safety plug 220. If even one of the sensors detects a condition outside a predetermined range of acceptable conditions, switch 260 may be operable to electrically disconnect power inverter 200 from the output terminals of safety plug 220. In another example, ground sensor 215 and AC power network sensor 232 may control switch 260 according to the process described with respect to FIG. 4, below.

While switches 225 and 260 are illustrated in FIG. 2A as two separate switches, it should be appreciated that switches 225 and 260 may alternatively be combined into one single switch. In such a configuration, the state of switch 260 may be determined by an electric signal sent by contact button 228, a signal sent from processor 236, a signal sent from AC power network sensor 232, or combinations thereof.

Processor

Power inverter 200 may further include processor 236. In one example, processor 236 may be responsible for data logging and computation functions. For example, processor 236 may be coupled to any of the modules described herein to obtain and record data associated with power inverter 200. Processor 236 may include a microprocessor operable to perform maximum power point tracking, data logging functions, display a user interface, calculate power converted by power inverter 200, communicate with the communications modules 240, and the like. Algorithms for maximum power point tracking and power conversion calculations are well-known and any such algorithm may be used in power inverter 200. Processor 236 may further include onboard memory for saving data logged by the module.

In one example, processor 236 may be further operable to provide feedback control to inverter coupling circuit 210. For example, if processor 236 determines that power inverter 200 is converting less power than the combined maximum ratings of the transformer modules currently inserted or encapsulated in power inverter 200, processor 236 may send an signal including an instruction to inverter coupling circuit 210 to turn off one of the transformer modules so as to maximize the conversion efficiency of the remaining transformer modules.

In another example, processor 236 may be further operable to detect additional power inverters 200 connected to an AC power network. In one example, this may be accomplished using a 9800 Hz line signal. For instance, processor 236 of the first inverter 200 may generate a 9800 Hz line signal with unique data such as a serial number and the amount of power being generated. The 9800 Hz signal may be carried on the line of the AC power network. When a second inverter 200 is plugged in, the 9800 Hz signal may be carried through safety plug 220 and may be detected by processor 236 which may respond based on the parameters of its programming.

In another example, three 600 W inverters may be plugged into a single 15 amp circuit of a household. If a fourth inverter is plugged into the same circuit, its processor 236 may detect the other three inverters. Because the 15 amp circuit cannot handle more than 1800 W of power, processor 236 of the fourth inverter may automatically open switch 260 to prevent overload of the circuit and would illuminate the corresponding warning light 264 and provide information through the user interface 238 or to a networked device via the communication module 240.

In yet another example, processor 236 may be operable to detect the presence and characteristics (e.g., power rating) of transformer modules. Processor 236 may be further operable to disconnect the components of power inverter 200 from DC input 204 by sending a signal to DC load switch 206 instructing it to open. In one example, this may be done in the event that the DC power input exceeds a predetermined value, such as the combined rating of the available transformer modules. According to one embodiment, this predetermined value may be 1800 W.

In yet another example, processor 236 may be operable to detect the power being generated by a DC power supply in real time, and would create a log of such data within its onboard memory. Processor 236 may be operable to perform calculations of aggregated data and prepare data for display. Data may then be displayed on the user interface 238 and sent to communication module 240 for transfer to external networked interfaces and devices (e.g., servers) for back-up and dump of memory off of processor 236.

User Interface

Power inverter 200 may further include user interface 238. User interface 238 may provide users an interface for viewing data associated with power inverter 200 and for configuring settings of the inverter. In one example, user interface 238 may allow users to determine the amount of power converted by power inverter 200. In another example, user interface 238 may be operable to provide status information (e.g., whether power inverter 200 is generating power), warnings, and issues with particular panels (e.g., need for cleaning or daily shading of a panel). In yet another example, user interface 238 may provide users an interface for updating firmware or sending data through a wireless connection.

User interface 238 may include any of a screen (e.g., a liquid crystal display (LCD)), a display panel, and warning lights 264. In one example, user interface 238 may be operable to report warnings associated with at least one of inverter coupling circuit 210, safety plug 220, AC power network sensor 232, and DC load switch 206. In one example, the components of power inverter 200 may send information to processor 236, which in turn causes the display of information through user interface 238.

While FIG. 2A shows user interface 238 connected to power inverter 200, it should be appreciated that user interface 238 may be located remotely from the inverter. For example, user interface 238 may be a networked computer or mobile device. User interface 238 and power inverter 200 may communicate through a wired or wireless connection.

Communications Module

Power inverter 200 may further include communications module 240 for storing or transmitting data associated with power inverter 200. In one example, communications module 240 may include network, WiFi, ZigBee, Bluetooth chips, or combinations thereof. The data transmitted by communications module 240 may include such information as the amount of power converted by power inverter 200, maximum power point tracking, equipment failures, voltage, current, harmonics, time intervals, global positioning coordinates, panel serial number, and the like. In one example, the data may be received from processor 236. Additionally, communications module may identify the source of the data using a serial number, for example.

In another one example, communications module 240 may include an interface for connecting to a flash memory, universal serial bus (USB) memory stick, or other portable memory device. In another example, communications module 240 may include a local data storage device such as a hard drive, flash memory, tape drive, or other storage device. In yet another example, communications module 240 may include a data transfer device, such as a modem, WiFi transmitter/receiver, or other wireless communications device for connecting to a remote storage device.

In one example, where communications module 240 includes a data transfer device, the data may be transferred to a utility company or other representative for the purpose of at least one of remote hook-up or disconnect, billing, feed-in tariffs, data management, data logging, grid balancing, maintenance, reporting, and comparison or manipulation of data to relevant metrics such as weather, generation vs. usage, aggregate data, and carbon offsets.

External Housings

Power inverter 200 may further include one or more housings to enclose the various components of power inverter 200. In one example, the housing may simply be a hard plastic or aluminum case used to cover and access the entirety of power inverter 200 or a particular component of power inverter 200. For example, a single, accessible housing may be used to enclose slots 270, 272, and 274 of power inverter 501 shown in FIG. 5B. By doing so, the slots may be protected while remaining readily accessible for removably coupling with one or more transformer modules.

Figure 2B:
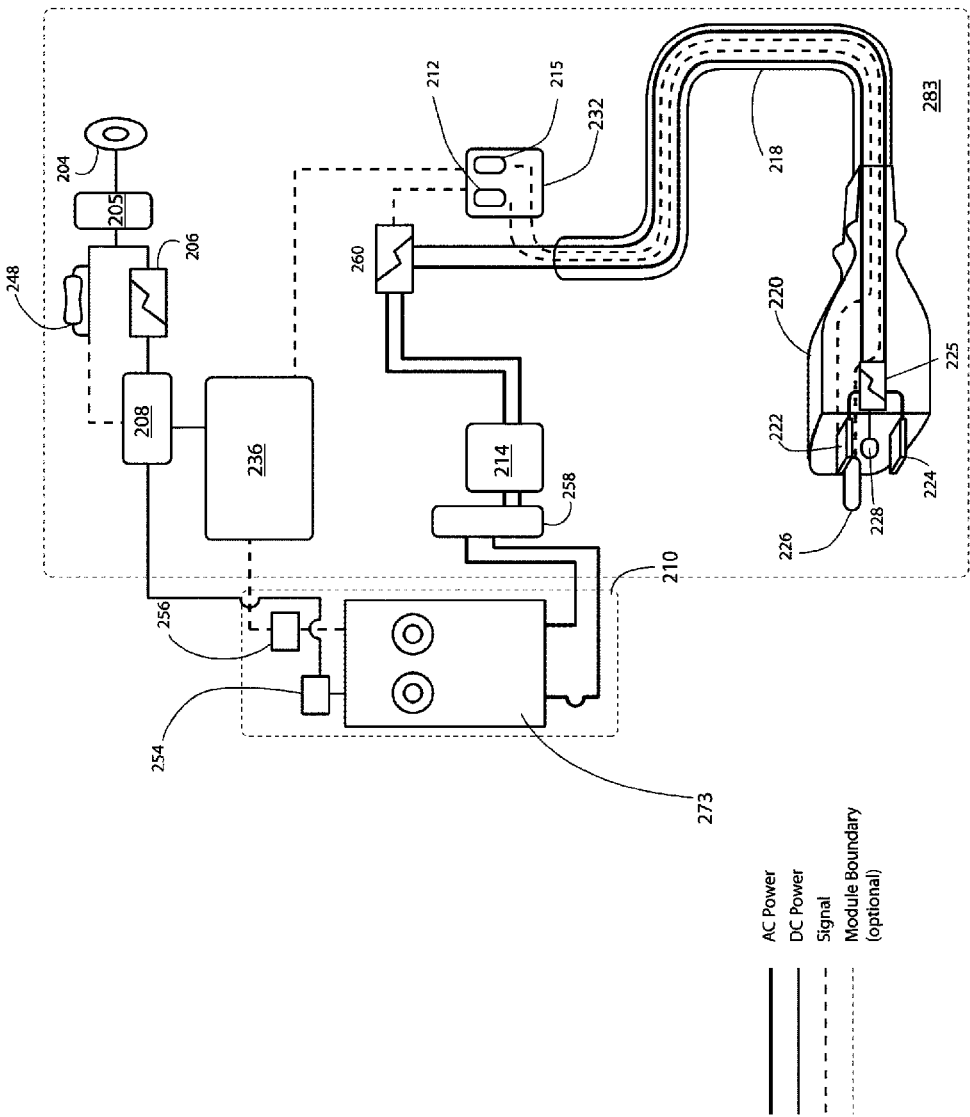
FIG. 2B illustrates an exemplary power inverter according to one embodiment.

FIG. 2B illustrates another embodiment of power inverter 201. The components and configuration illustrated by FIG. 2B are similar to that of FIG. 2A. The embodiment illustrated by FIG. 2B combines DC module 280 and AC module 282 of FIG. 2A into a single module 283. Further, inverter coupling circuit 210 of power inverter 201 is coupled to an external transformer module 273, as shown in FIG. 2B. According to this embodiment, power inverter 201 may be operable to connect to one or more external transformer modules. This allows power inverter 201 to be operable to convert a large input range of DC power while not being restricted to a particular number or size of transformer modules. Notably, shared components of power inverter 201, such as processor 236 and output safety plug 220 need not be duplicated.

The features of power inverter 200 and 201 described above allow the inverter to improve the efficiency of the conversion of DC power to AC power by matching the optimal power rating of power inverter 200 to the DC power input. In one example employing a plurality of transformer modules, this is done by adjusting the number of active transformer modules. This is especially beneficial when power inverter 200 is used with generators having intermittent and highly variable DC outputs, such as renewable energy generators. For example, solar panels generate less power during the mornings, evenings, and on overcast days.

Operational Processes

Figure 3:
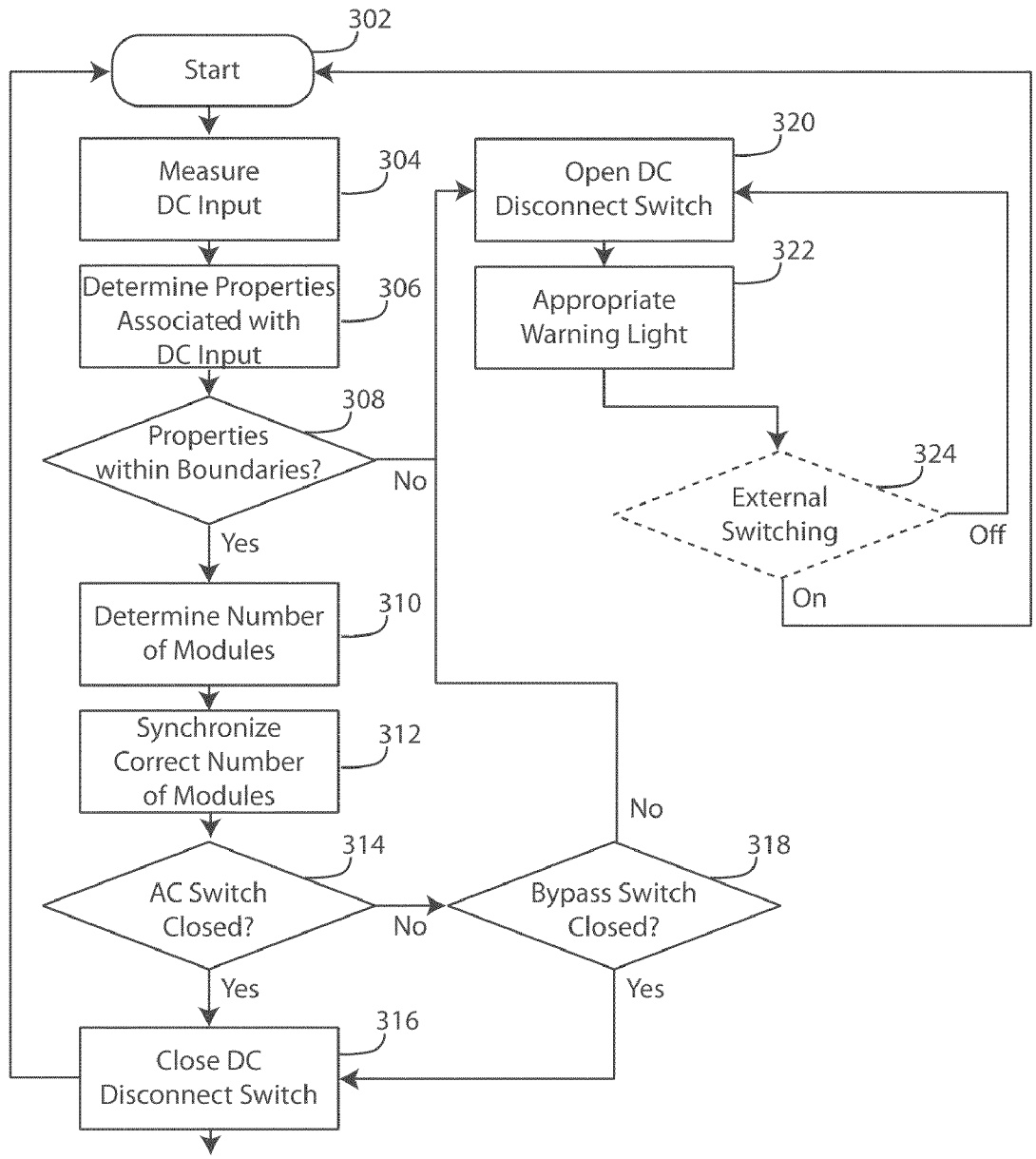
FIG. 3 illustrates an exemplary process for matching the power rating of a power inverter to a DC power input according to one embodiment.

FIG. 3 illustrates an exemplary process 300 for matching the power rating of power inverter 200 to the DC power input. The process begins at block 302. At block 304, a processor, for example, processor 236, may be operable to determine the amount of power received at DC input 204 using DC power sensor 248.

At block 306, processor 236 may determine properties associated with the DC input. For example, the properties may include voltage or current.

At block 308, processor 236 may determine whether the properties associated with the DC input falls within predetermined boundaries. These boundaries may represent the range of acceptable DC input levels that power inverter 200 is capable of converting. If the properties are within the predetermined boundaries, the process moves to block 310. However, if the properties are not within the predetermined boundaries, the process moves to block 320.

At block 310, processor 236 may determine the number of transformer modules connected to power inverter 200. At block 312, processor 236 may synchronize the appropriate number of transformer modules. Processor 236 may determine the appropriate number of modules using the known value of the input DC power and the power ratings of each transformer module. Assuming each transformer module has the same power rating, the appropriate number of transformer modules refers to the minimum number of transformer modules required to convert the input DC power. However, if the transformer modules have different power ratings, the appropriate number of transformer modules refers to the combination of transformer modules that results in the lowest power rating which is still greater than the input DC power level.

At block 314, processor 236 determines whether AC switch 260 is closed. If the switch is closed, processor 236 moves to block 316. If the switch is open, the process moves to block 318.

At block 316, DC load switch 316 is closed. This may complete the circuit allowing the input power to flow from DC input 204, through inverter coupling circuit 210, and out through AC bypass 233 or safety plug 220.

If at block 314 it is determined that AC switch 260 is open, the process arrives at block 318. At block 318, processor 236 determines whether AC bypass switch 234 is closed. If AC bypass switch 234 is closed, the process proceeds to block 316. However, if AC bypass switch 234 is open, the process proceeds to block 320.

If at block 308 it is determined that the DC input does not fall within the predetermined boundaries, or if at block 318 AC bypass switch 234 is open, the process arrives at block 320. At block 320, DC load switch 206 is opened.

At block 322, processor 236 may turn on an appropriate warning light, for example, warning lights 264.

At block 324, processor 236 may determine the position of an external switch. In one example, the external switch maybe a manual external shut-off switch (not shown) operable to open DC load switch 206 as described above. If the switch is set to open DC load switch 206, the process returns to block 320. However, if the switch is set to close DC load switch 206, the process returns to block 302.

To illustrate, in one example, power inverter 200 may include five transformer modules electrically coupled to inverter coupling circuit 210. Each transformer module may have an optimal power rating of 120 W creating a combined maximum optimal power rating of 600 W. Additionally, power inverter 200 may be connected to two 60 W solar panel via DC input 204.

In this example, when the 60 W solar panels are connected to DC input 204 of power inverter 200, DC power sensor 248 may detect the amount of power being received from the external DC source. DC power sensor 248 may then send a signal to processor 236 indicating of the amount of power being received. Based on the measured value received from DC power sensor 248, the processor may determine the number of transformer modules required to convert the DC input into an AC output.

Additionally, the processor may be further operable to detect and control the transformer modules coupled to inverter coupling circuit 210. For instance, the processor may be operable to selectively cause individual transformer modules to turn on and off based on the measurements received from DC power sensor 248.

Since 120 W of DC power is being received at DC input 204, the processor may cause only one of the five 120 W transformers to turn on. However, in another example, if a third 60 W solar panel is connected to the first 60 W solar panel in series, a total of 180 W of DC power may be produced and sent through DC input 204 of power inverter 200. In this example, DC power sensor 248 may detect the change in the DC power input and send a signal to the processor indicating that the DC power input is 180 W. Since the DC power input is now greater than 120 W, an additional transformer module is required to convert the DC power input. Thus, the processor may cause a second 120 W transformer to turn on, synchronizing the two transformers using, in one embodiment, a control transformer, thereby increasing the power converting capacity of power inverter 200 to 240 W.

Similarly, in another example, the processor may be operable to turn off a transformer module in response to a decrease in the DC power input. For instance, four 60 W solar panels generating a total of 240 W of DC power may be connected to DC input 204. In this example, the processor may turn on two 120 W transformer modules to provide sufficient conversion capacity. However, if one 60 W solar panel is removed, only 180 W of DC power may be generated by the three 60 W solar panels. In this example, DC power sensor 248 may measure the power input level and send a signal to the processor indicating that the input power level is now 180 W. In response, the processor may cause one 120 W transformer module to turn off since two 120 W transformer modules are sufficient to convert 180 W of DC power.

While the examples provided above describe a change in the DC power input due to adding or removing generators, it should be understood that power inverter 200 may react to fluctuations in the DC input caused by any factor, such as overcast weather or the movement of the sun throughout the day, causing the system power to peak at noon and to fall off both in the morning and in the evening. For instance, while four 60 W solar panels may produce 240 W of power during the day, in the early morning, they may only be generating 60 W collectively. Power inverter 200 may detect and react to the change as described above if a generator were removed.

Figure 4:
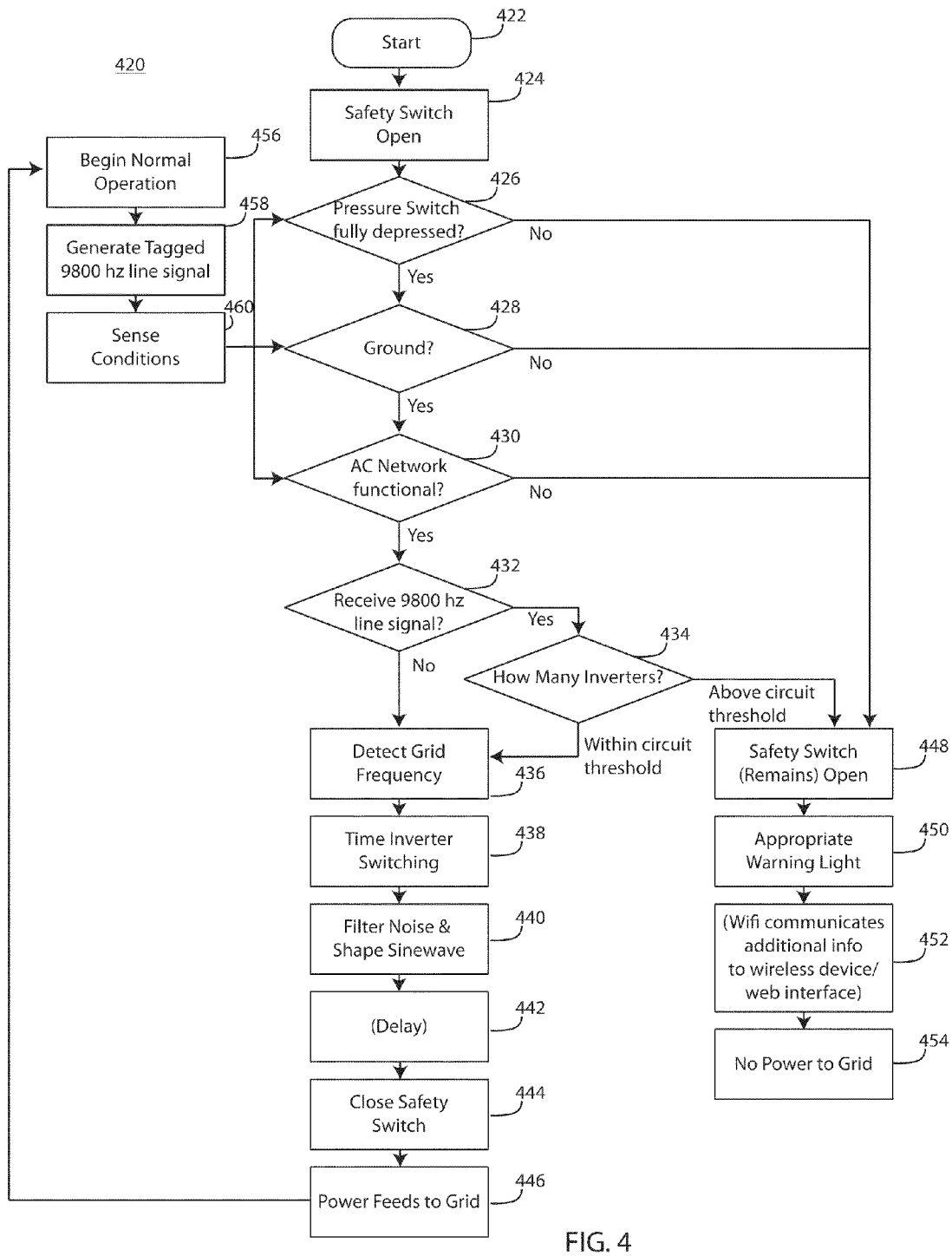
FIG. 4 illustrates an exemplary process for controlling a switch according to one embodiment.

FIG. 4 illustrates an exemplary process 420 for controlling switch 260 according to one embodiment. The process begins at block 422. At block 424, switch 260 has its state set to "open." This state disconnects power inverter 200 from the output terminals of safety plug 220. At block 426, contact button 228 sets contact button switch 225 to either the open or closed position. If contact button 228 is depressed to a predefined threshold representing a sufficient insertion into a socket, the process moves to block 428. At block 428, power inverter 200 may attempt to detect an electrical ground through grounding pin 226 using ground sensor 215. If an electrical ground is detected, the process moves to block 430. At block 430, AC power network sensor 232 may attempt to detect a property associated with the AC power network attached to safety plug 220. It is then determined whether the property associated with the AC power network falls within a predefined range. The predefined range may represent characteristics of an active AC power network. If the property associated with the AC power network falls within the predefined range, the process proceeds to block 432. However, if any of the conditions detected at block 426, 428, and 430 fail to fall within predefined ranges, the process proceeds to block 448. It should be appreciated that while blocks 426, 428, and 430 were described in a particular order, the conditions may be checked in any order or may be checked in parallel.

At block 432, power inverter 200 determines whether a 9800 Hz line signal is received. As described above, the 9800 Hz line signal may be carried on the line of the AC power network and may include unique data such as a serial number and the amount of power being generated by a particular power inverter. If no 9800 Hz line signal is received, then the process moves to block 436. However, if a 9800 Hz line signal is received, the process moves to block 434. At block 434, a processor determines the number of inverters present using the received 9800 Hz line signal. If the number of inverters is above the circuit threshold, the process moves to block 448. However, if the number of inverters is within the circuit threshold, the process moves to block 436.

At block 436, the frequency of the AC power network is detected. In one example, clock sensor 212 may detect the frequency of the AC power network as described above. Once the frequency of the AC power network is detected, the process moves to block 438. At block 438, power inverter 200 performs time inverter switching. Time inverter switching involves processor 236 in conjunction with AC power network sensor 232 synchronizing the switching of the transformer modules to the AC power network and to the other transformer modules.

At block 440, the converted AC power may be sent to filter and wave shaper 214. Once the AC power is shaped and filtered, the process moves to block 442. At block 442, a safety delay of predetermined length may be used to allow the converted AC power to propagate through the circuitry of power inverter 200. After the delay of block 442, the process moves to block 444. At block 444, the state of switch 260 is set to "closed." This state connects power inverter 200 to the output terminals of safety plug 220. The process moves to block 446, whereby placing switch 260 in the "closed" state allows power to flow from power inverter 200 to the output terminals of safety plug 220. In one example, the power from the output terminals of safety plug 220 may be sent to an AC power network.

Once the power is fed to the AC power network, the process proceeds to block 456. At block 456, power inverter 200 begins normal operation. Normal operation refers to the conversion of DC power to AC power and outputting the AC power to the AC power network through safety plug 220. Normal operation may also include continuous maximum power point tracking, data logging and communications, and grid sensing for real-time synchronization and anti-islanding, and detecting underload and overload of the DC source.

At block 458, power inverter generates a tagged 9800 Hz signal. This signal propagates over the AC power network, and may serve to alert other inverters connected to the network of the inverter's presence within the same circuit. In one example, the 9800 Hz signal may indicate the make and model of the inverter, its serial number, the amount of rated power it can generate, and the amount of power it is currently generating.

At block 460, the process returns to blocks 426, 428, and 430 where power inverter 200 detects conditions such as the depression of depressible projection 228, the presence of an electrical ground, and a property associated with the AC power network.

As discussed above, if any of the conditions required at blocks 426, 428, 430, or 434 fail, the process moves to block 448. At block 448, the state of switch 260 remains set to "open." At block 450, a warning light may be set. In one example, this may be part of user interface 238 or warning lights 264. At block 452, communications module 240 may communicate information associated with power inverter 200 to a wireless device or web interface. The destination and information sent may be similar to the examples provided above with respect to the description of communications module 240. At block 454, no power is sent to the AC power network since power inverter 200 is disconnected from the output terminals of safety plug 220.

According to one embodiment, power inverter 200 may include safeguards to prevent islanding. As previously discussed, islanding refers to the condition whereby a distributed generator continues to power a location even though power from the electric utility or household circuit is no longer present. This creates a dangerous situation as others may not be aware of the generator and may be harmed by the generated power.

In one example, power inverter 200 may prevent islanding using the process detailed above with respect to FIG. 4. In particular, by requiring certain criteria to be satisfied prior to being connected to an AC power network. These criteria may include 1) detection of an AC load, 2) detection of a ground, and 3) a delay to allow synchronization of AC power network sensor 232 to the AC power network. The operation of the islanding safeguards according to one embodiment will be illustrated using an example provided below.

In one example, an external DC power source may be connected to DC input 204 of power inverter 200. Additionally, safety plug 220 may be plugged into a socket connected to an AC power network. Initially, output terminals 222 and 224 of safety plug 220 may be "cold," meaning no power is being output through terminals 222 and 224 of the plug. Power inverter 200 may detect that is has been connected to an AC power network using AC power network sensor 232 which may be operable to detect a load or voltage associated with the AC power network. AC power network sensor 232 may then send a signal to a processor, such processor 236.

Additionally, power inverter 200 may attempt to detect an electrical ground through grounding pin 226. This may be done using AC power network sensor 232, or alternatively by using another sensor. In either case, a signal may be sent from the sensor to a processor, such as processor 236. While checking the AC load has been described as being done prior to checking the electrical ground, it should be appreciated that either condition may be checked before the other, or that both conditions may be checked in parallel.

Once the processor has been notified by AC power network sensor 232 that both a load and an electrical ground have been detected, the processor may wait a predefined length of time to allow AC power network sensor 232 to synchronize to the frequency of the AC power network. The process of synchronizing has been described above with respect to AC power network sensor 232. Upon expiration of the predetermined delay, the processor may cause output terminals 222 and 224 to become "hot." In this context, "hot" means that AC power is being output through terminals 222 and 224.

According to another example, fluctuations in the AC load and/or electrical ground may cause the safety plug to go cold. For example, if the AC network drops out, power inverter 200 will attempt to power the entire network and the voltage will rise infinitely. After a delay (e.g., two seconds), the inverter should automatically shut off if conditions outside the boundary of normal voltages are detected. The delay is desirable because the AC power network is not perfect, and a degree of fluctuations occur normally.

Examples

Figure 5A:
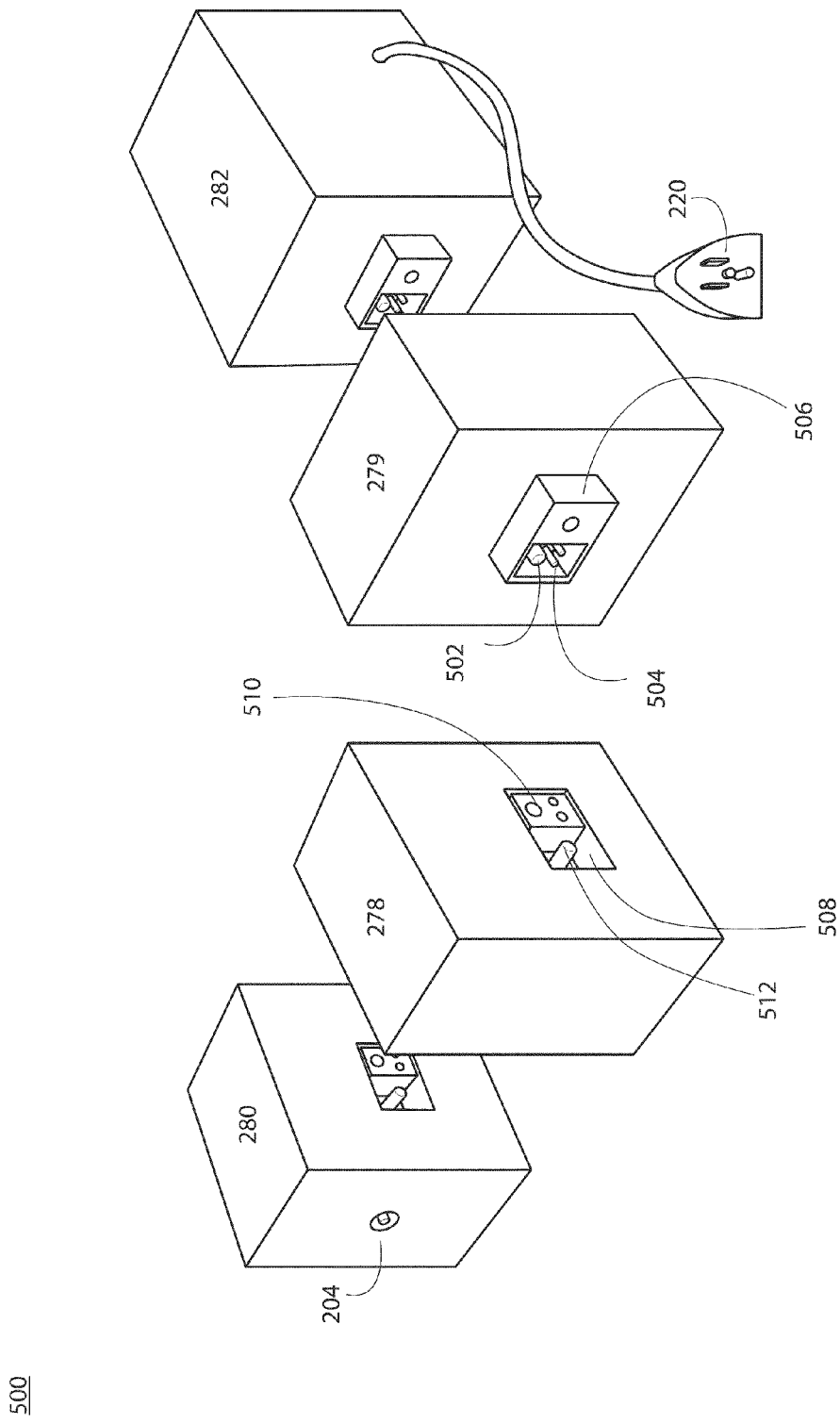
FIG. 5A illustrates an exemplary power inverter according to one embodiment.

FIG. 5A illustrates exemplary power inverter 500 according to one embodiment. In this example, the components of DC module 280 may be enclosed in a separate housing. For instance, module 280 may include DC input 204, blocking diode 252, DC power sensor 248, DC load switch 206, power regulator 208, DC bypass switch 235, potentiometer 246, and DC bypass outlet 250. In the example shown in FIG. 5A, only DC input 204 may be visible while the remaining components are concealed by the housing unit.

Additionally, AC module 282 may be enclosed in a separate housing from DC module 280. In this example, AC module 282 may include user interface 238, warning lights 264, processor 236, communication module 240, step-up or step-down transformer 258, filter and wave shaper 214, AC bypass switch 234, AC bypass outlet 233, switch 260, AC power network sensor 232, clock sensor 212, ground sensor 215, output cable 218, and safety plug 220. As shown in FIG. 5A, all of the components of AC module 282 are enclosed in the housing unit except for output cable 218 and safety plug 220.

Further, in this example, inverter coupling circuit 210 may be enclosed in a separate housing from both DC module 280 and AC module 282. It should be noted that inverter coupling circuit 210 may be enclosed in a single housing comprising any number of transformer modules. For example, the housing for inverter coupling circuit 210 may include two transformer modules or may alternatively be made up of two separate housings 278 and 279 having one transformer module each.

Inverter coupling circuit 210, DC module 280, and AC module 282 may further include coupling circuitry similar to coupling circuitry 502, 504, 506, 508, 510, and 512, to allow the modules to be coupled together. According to one embodiment, coupling circuitry 502, 504, 506, 508, 510, and 514 allow for interfacing between modules 278, 279, 280, and 282. However, it should be understood by one of ordinary skill in the art that other connectors may be used.

According to one embodiment, module 280 of power inverter 500 may be operable to receive a DC power input at DC input 204. Power inverter 500 may further include module 282 operable to output AC power and control safety plug 220 as described above with respect to FIG. 4. Power inverter 500 may further include modules 278 and 279, each of which includes a transformer module operable to convert DC power to AC power. Modules 278 and 279 may be coupled to modules 280 and 282 to increase the power rating of power inverter 500.

In one example, where only a small amount of DC power is being converted, power inverter 500 may include only modules 279, 280 and 282. In this example, the DC power input is sent through DC input 204 of module 280. Module 280 may perform power cleaning functions and send a DC output to module 279. Module 279 may then convert the DC power into AC power and output the converted AC power to module 282. Module 282 may then output the AC power through safety plug 220.

In another example, when the DC power being converted exceeds the rating of module 278, an additional module 279, which includes a transformer module, may be coupled to modules 278, 280, and 282 to increase the power rating of power inverter 500. In this example, modules 278 and 279 may each convert a portion of the received DC power input into an AC output. Notably, the embodiment of FIG. 5A allows for the expansion of inverter capacity, without the need for duplication of the shared components of DC module 280 and AC module 282. While FIG. 5A shows only two modules 278 and 279, it should be noted that any number of additional modules resembling 278 and 279 could be employed as the generating capacity requires.

Figure 5B:
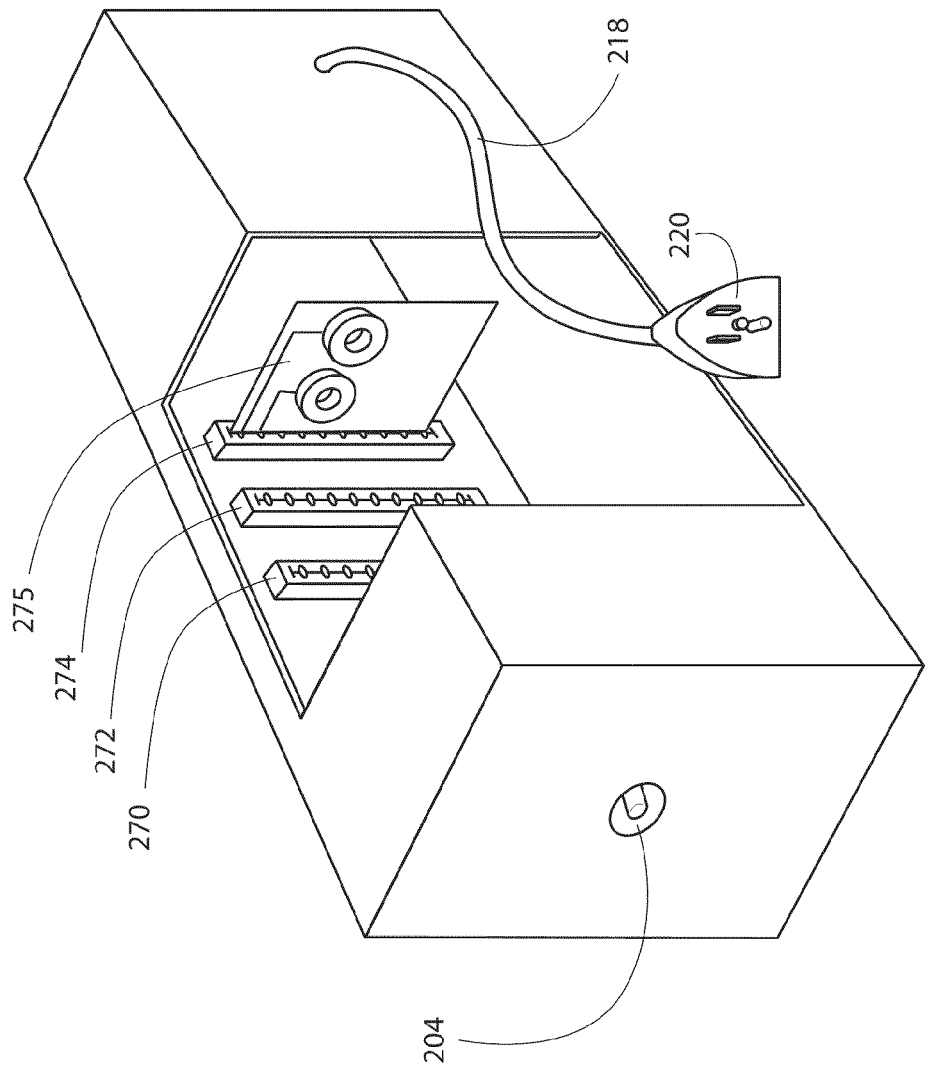
FIG. 5B illustrates an exemplary power inverter according to one embodiment.

FIG. 5B illustrates exemplary power inverter 200 according to one embodiment. In this example, the components of DC module 280 and AC module 282 are combined into a single housing unit. This is similar to FIG. 2B, which combined DC module 280 and AC module 282 into module 283.

In one example, DC power is received at DC input 204 and sent to inverter coupling circuit 210 (not shown), which includes slots 270, 272, and 274. In this example, a single transformer module 275 is placed in slot 274. Transformer module 275 may convert the received DC power into AC power, which is then output through output cable 218 and safety plug 220.

Computing System

Figure 6:
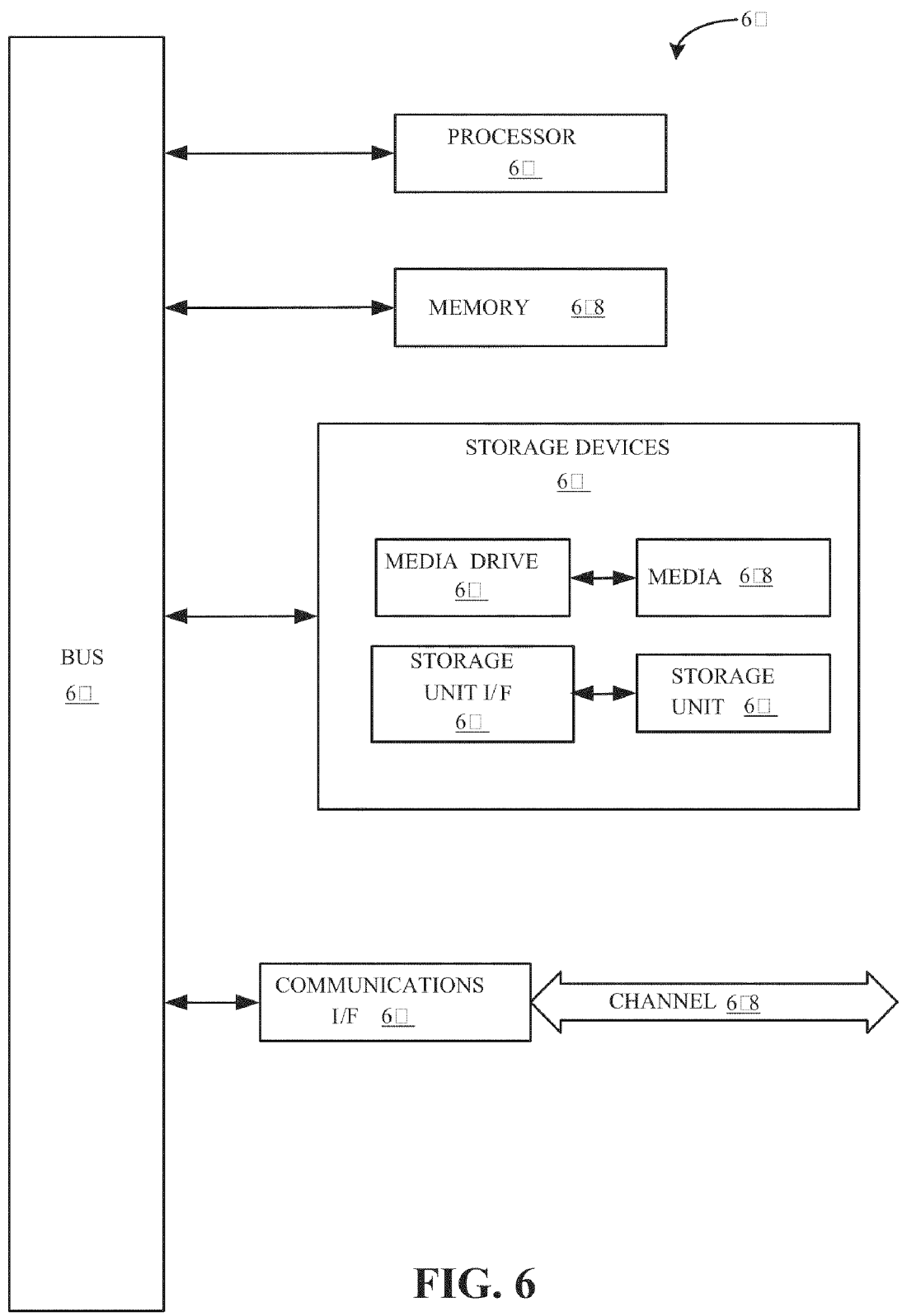
FIG. 6 illustrates a typical computing system that may be employed to implement some or all processing functionality in certain embodiments.

FIG. 6 illustrates an exemplary computing system 600 that may be employed to implement processing functionality for various aspects of the current technology (e.g., processor 236, a user/client device, media server, media capture server, media rules server, rules store, media asset library, activity data logic/database, combinations thereof, and the like.). Those skilled in the relevant art will also recognize how to implement the current technology using other computer systems or architectures. Computing system 600 may represent, for example, a user device such as a desktop, mobile phone, personal entertainment device, DVR, and so on, a mainframe, server, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals, which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable the computing system 600 to perform features or functions of embodiments of the current technology.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the technology as described herein.

It will be appreciated that, for clarity purposes, the above description has described embodiments with reference to different functional units and processors. However, it will be apparent that any suitable distribution of functionality between different functional units, processors or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A power inverter for converting a direct current (DC) power to an alternating current (AC) power, the inverter comprising:
    an input terminal for connecting to an external DC power source, the DC power source having a DC power;
    an inverter coupling circuit operable to electrically couple to a first transformer module and a second transformer module, wherein each transformer module is operable to convert at least a portion of the DC power to at least a portion of the AC power;
    an output terminal for outputting the AC power to an AC power network;
    an AC power network sensor for detecting a property associated with the AC power network;
    a DC power sensor for detecting a property associated with the DC power source;
    a first switch for electrically connecting the inverter coupling circuit to the output terminal, wherein the state of the first switch is determined by the AC power network sensor; and
    a second switch for electrically connecting the DC power source to the inverter coupling circuit, wherein the state of the second switch is determined by the DC power sensor.

2. The power inverter of claim 1, wherein the output terminal is connected to an AC power network.

3. The power inverter of claim 1, wherein the output terminal is located on an output safety plug for outputting the AC power, the output safety plug comprising:
    the output terminal, wherein the output terminal is operable to connect to a socket configured to receive the output safety plug, wherein the socket is connected to an AC power network;
    a contact sensor for detecting a sufficient contact between the output terminal of the output safety plug and the socket, wherein the contact sensor is connected to the safety plug; and a third switch for electrically connecting the inverter coupling circuit to the output terminal of the safety plug, wherein the state of the third switch is determined by the contact sensor.

4. The power inverter of claim 1, wherein the inverter coupling circuit includes a first slot operable to removably couple to the first transformer and a second slot operable to removably couple to the second transformer.

5. The power inverter of claim 1, further comprising a processor operable to control one or more parameters of the first transformer module or one or more parameters of the second transformer module.

6. The power inverter of claim 5, wherein the one or more parameters of the first transformer is whether the first transformer module is active or inactive.

7. The power inverter of claim 5, wherein:
the processor is contained in a first housing,
the inverter coupling circuit is contained in a second housing, and
the first housing is separate from the second housing.

8. The power inverter of claim 1, wherein the inverter coupling circuit is contained within a housing, and wherein the inverter coupling circuit is further operable to electrically couple to an external transformer module, the external transformer module being external to the housing.

9. The power inverter of claim 1, wherein:
the inverter coupling circuit is contained in a first housing,
the input terminal for connecting to an external DC power source is contained in a second housing, and
the first housing is separate from the second housing.

10. The power inverter of claim 1, wherein:
the inverter coupling circuit is contained in a first housing,
the output terminal for outputting the AC power to an AC power network is contained in a second housing, and
the first housing is separate from the second housing.

11. The power inverter of claim 1, wherein:
the input terminal for connecting to an external DC power source is contained in a first housing,
the output terminal for outputting the AC power to an AC power network is contained in a second housing, and
the first housing is separate from the second housing.

12. The power inverter of claim 1, wherein:
the first transformer module is contained in a first housing,
the second transformer module is contained in a second housing, and
the first housing is separate from the second housing.

13. The power inverter of claim 1, further comprising a power regulator configured as a maximum power point tracker (MPPT) or a DC to DC converter controlled by a maximum power point tracking algorithm.

14. A power inverter for converting a direct current (DC) power to an alternating current (AC) power, the inverter comprising:
an input terminal for connecting to an external DC power source, the DC power source having a DC power;
an inverter coupling circuit comprising a transformer operable to convert at least a portion of the DC power to at least a portion of the AC power;
an output safety plug for outputting the AC power, the output safety plug comprising:
an output terminal for connecting to a socket configured to receive the output safety plug, wherein the socket is connected to an AC power network;
a contact sensor for detecting a sufficient contact between the output terminal of the output safety plug and the socket, wherein the contact sensor is connected to the safety plug; and
a first switch for electrically connecting the inverter coupling circuit to the output terminal of the safety plug, wherein the state of the first switch is determined by the contact sensor;
an AC power network sensor for detecting a property associated with the AC power network;
a DC power sensor for detecting a property associated with the DC power source;
a second switch for electrically connecting the inverter coupling circuit to the output terminal of the output safety plug, wherein the state of the second switch is determined by the AC power network sensor; and
a third switch for electrically connecting the DC power source to the inverter coupling circuit, wherein the state of the third switch is determined by the DC power sensor.

15. The power inverter of claim 14, wherein the first switch and the second switch are the same switch.

16. The power inverter of claim 14, wherein the inverter coupling circuit is operable to electrically couple to an external transformer, wherein the external transformer is operable to convert at least a portion of the DC power to at least a portion of the AC power.

17. The power inverter of claim 14, wherein the inverter coupling circuit is operable to electrically couple to two or more external transformers, wherein the external transformers are operable to convert at least a portion of the DC power to at least a portion of the AC power.

* * * * *